UNITED STATES PATENT OFFICE.

WILLIAM ELMER, OF NEW YORK, N. Y.

IMPROVEMENT IN PRODUCING ILLUMINATING-GAS.

Specification forming part of Letters Patent No. 39,388, dated August 11, 1863; antedated May 13, 1863.

*To all whom it may concern:*

Be it known that I, WILLIAM ELMER, M. D., of the city, county, and State of New York, have invented a new and useful improvement in the production of olefiant gas from water and naphtha or benzole, in conjunction with zinc; and I do hereby declare the following to be a full, clear, and exact description of the same.

The nature of my invention consists in the production of pure olefiant gas, which consists of eighty-six of carbon to fourteen of hydrogen.

The illuminating properties of a gas or a mixture of gases depends upon the relation which the carbon in it bears to the hydrogen. It is well known that ordinary coal-gas is not a definite compound of light or heavy carbides of hydrogen, nor olefiant gas, but a mechanical mixture of all of these substances with oily volatile products of very different chemical character, of which substances some are not at all luminous, while others are only slightly so. It is also well known that olefiant gas is the principal constituent in coal-gas, and the one to which the latter owes its illuminating-power. The gaseous mixture of coal-gas, after the separation of the aqueous fluid and the tar, consists of hydrogen, bihydride of carbon, olefiant gas, volatile hydrocarbon, benzole, carbonic oxide, sulphide of hydrogen, ammonia, carbonic acid, bisulphide of carbon, nitrogen, &c. Some of these noxious and useless impurities are separated before the gaseous mixture is used; but no means have heretofore been devised for obtaining pure olefiant gas from coal, nor from any other substances from which it can be produced free from noxious impurities, and sufficiently cheap for lighting purposes. This desideratum is attainable by the following method:

Benzole or naphtha (or other analogous substances) and water are employed in the proportions of ten pounds of benzole or naphtha to six and one-third pounds of water. These are previously mixed by agitation and introduced into a proper vessel or preheater, where they are converted into vapors, the preheater being so arranged and heated that both liquids are converted conjointly into vapors, which vapors are conveyed into a gas-retort containing about twenty-three pounds of granulated zinc. The retort is heated to a red heat previous to the introduction of the vapors and maintained at a high temperature during the operation of producing the gas. In this process the water and naphtha or benzole, whichever be used, are decomposed, the oxygen of the former uniting with the zinc, forming an oxide with this metal. At the same time the hydrogen of the water is set free and the carbon of the benzole is brought into the nascent state, in which condition the liberated hydrogen in the retort instantly combines in the exact proportions with the carbon to form olefiant gas—$C_2H_2$ or $C_4H_4$.

The advantages arising from the manufacture of olefiant gas by this process are, first, in employing zinc, as before described, the oxide of this metal is formed, which, as is well known, is valuable not only as a paint, but for many other purposes, and will fully compensate for the whole cost of manufacturing the gas, while the gas is pure, affording a white flame of great brilliancy. Again, the gas is not decomposed by heat, as is the case with the ordinary methods of gas manufacture, in which the olefiant gas produced in the process is kept too long under the effects of a high degree of heat, whereby it becomes more or less decomposed, and hence the most important or valuable part of the gas is lost; but by this method the gases are set free the very instant the vapors come in contact with the heated zinc in the retort. The olefiant gas, as soon as it is formed, passes directly from the retort, and other vapors follow in like manner, so long as the supply is kept up and the proper degree of heat is maintained in the preheater and retort, so that this method of producing olefiant gas is a continuous process, and one of great utility.

I have described a convenient form of apparatus for producing all the effects referred to in this specification in another application for improvements in the production of olefiant gas entered in the Patent Office on the same date as the entry of this application, though I do not confine myself to any particular form of apparatus.

What I claim as new, and desire to secure by Letters Patent, is—

1. The production of pure olefiant gas from benzole or naphtha and water, in conjunction with zinc, by preheating the former substances, so as to form vapors, and bringing said vapors into contact with a certain quantity of metallic zinc heated to the requisite degree, as herein set forth.

2. The continuous process in the manufacture of olefiant gas, in which the gas is not decomposed, and the production of oxide of zinc by the decomposition of the vapors of water, as herein described.

WILLIAM ELMER.

Witnesses:
E. MAHER,
ROBERT J. TRUSCOTT.